(12) United States Patent
Gresham

(10) Patent No.: US 6,925,544 B2
(45) Date of Patent: Aug. 2, 2005

(54) PACKET BUFFER MEMORY WITH INTEGRATED ALLOCATION/DE-ALLOCATION CIRCUIT

(75) Inventor: Paul Gresham, Arnprior (CA)

(73) Assignee: Zarlink Semiconductor, Inc. (CA)

( * ) Notice: Subject to any disclaimer, the term of this patent is extended or adjusted under 35 U.S.C. 154(b) by 261 days.

(21) Appl. No.: 10/410,379

(22) Filed: Apr. 9, 2003

(65) Prior Publication Data

US 2003/0212875 A1 Nov. 13, 2003

(30) Foreign Application Priority Data

Apr. 16, 2002 (GB) .............................................. 0208617

(51) Int. Cl.$^7$ .............................................. G06F 12/00
(52) U.S. Cl. .................................................... 711/170
(58) Field of Search ............................... 711/170, 171, 711/172, 173

(56) References Cited

U.S. PATENT DOCUMENTS

| 6,212,613 | B1 | 4/2001 | Belair |
| 6,279,080 | B1 | 8/2001 | DeRoo |
| 6,286,088 | B1 | 9/2001 | Campbell et al. |

*Primary Examiner*—Hiep T. Nguyen
(74) *Attorney, Agent, or Firm*—Jones Day

(57) ABSTRACT

A buffer memory with a memory allocation and de-allocation circuit. The buffer memory has an address space divided into address blocks and a memory address space divided into memory blocks. The circuit, in response to an allocation request for an allocation of a certain size buffer, allocates sufficient address blocks and memory blocks for the buffer. The circuit, in response to a de-allocation request to de-allocate a certain size of memory, de-allocates whole unused address blocks and memory blocks.

22 Claims, 8 Drawing Sheets

PACKET BUFFER MEMORY WITH INTEGRATED ALLOCATION/DE-ALLOCATION CIRCUIT

FIELD OF INVENTION

This invention relates to memory and in particular to a buffer memory with an integrated allocation and de-allocation circuit.

BACKGROUND OF THE INVENTION

Buffer memory for temporary storage of packet data has to accommodate high traffic rates with a wide range of packet sizes. The traditional techniques for dealing with such packet data is to pre-allocate the maximum buffer size for all traffic. In systems with large amounts of memory available this is the most economic solution, but it implies external hardware, memory chips and memory controllers. It also implies large bus interfaces to the external hardware and larger propagation delays through pin electronics. Thus, integrated circuit chips using traditional approaches have very high pin counts and chips sets with large pin counts also have complex wiring requirements for printed circuit boards.

A number of memory management techniques for buffer memory have been implemented. For example, memory allocation tables are typically managed in software by a processor, usually running with an operating system that provides for the allocation and de-allocation of memory. For example, the operations of malloc( ) and free( ) are standard 'C' function calls. However, the calls can not de-allocate part of an allocation, only the whole of an allocation.

Furthermore, traditional techniques for dealing with memory fragmentation are only partially effective. Most operating systems contain routines that can traverse the lists of allocated and de-allocated memory, and consolidate the de-allocated lists into fewer, larger chunks. However, all software controlled memory allocations takes longer to process because of the serial nature of the processor's instruction stream, and the complexity in most modern operating systems.

Most hardware controlled memory management units maintain allocation tables in main memory, and use memory allocation caches that contain associative look-up tables. These work very well, except that the caches are of limited size. When a cache miss occurs, the bus transfer must be trapped in mid cycle, and the missing cache entries must be loaded from the allocation tables in memory. All of this adds to the complexity of the hardware and software.

Most memory control hardware or software cannot return portions of unused memory back into the memory pool. In order to accomplish this, another allocation of the correct size is required, followed by a memory to memory copy of the data from the larger allocation to the smaller allocation. Then the larger allocation can be completely returned back to the memory pool. This process has undesirable overheads (memory to memory copy, and additional memory allocation).

It is therefore desirable to provide a buffer memory, which addresses, in part, some of the shortcomings of providing buffer memory noted above.

SUMMARY OF THE INVENTION

According to another aspect of the present invention, there is provided a buffer memory with a memory allocation and de-allocation circuit. The buffer memory has an address space divided into address blocks and a memory address space divided into memory blocks. The circuit, in response to an allocation request for an allocation of a certain size buffer, allocates sufficient address blocks and memory blocks for the buffer. The circuit, in response to a de-allocation request to de-allocate a certain size of memory, de-allocates whole unused address blocks and memory blocks.

According to another aspect of the present invention, there is provided a memory circuit for buffering data, the memory circuit having an address input bus with an address space for receiving address data, a data input bus for receiving data, and a data output bus for outputting data; comprising a buffer memory having a memory address space and memory address data, an address port for receiving the memory address data to address the buffer memory, a data input port to receive the data over the data input bus for storing in the buffer memory, and a data output port for outputting the data stored in the buffer memory over the data output bus;

an address translator to receive the address data for translation into the memory address data and providing the memory address data to the address port of the buffer memory; and a memory allocation circuit having an allocation/de-allocation signal line for receiving allocation and de-allocation requests, a byte count bus for receiving a byte count with each of the allocation and de-allocation requests, an addressing bus for providing a first start address in response to an allocation request and receiving a second start address with a de-allocation request, and a control bus to load data to the address translator for translating the address data to the memory address data;

wherein the address space is divided into address blocks, the memory address space is divided into memory blocks, and each address block comprises a whole number of memory blocks;

wherein the memory allocation circuit, in response, to the allocation request, allocates sufficient consecutive addresses in the address space in the address blocks and sufficient number of the memory blocks of the buffer memory to store the byte count amount of memory, provides the first start address over the address bus, and loads the data to the address translator for translating the address data to the memory address data; and wherein the memory allocation circuit, in response, to the de-allocation request, de-allocates the address blocks starting at the first whole address block from the second start address for the whole address blocks of the byte count amount of memory and de-allocates the memory blocks corresponding to the de-allocated address blocks.

According to another aspect of the present invention, there is provided a method to allocate and de-allocate memory of a memory circuit for buffering data, the memory circuit comprising an address input bus with an address space for receiving address data, a data input bus for receiving data, and a data output bus for outputting data;

a buffer memory having a memory address space and memory address data, an address port for receiving the memory address data to address the buffer memory, a data input port to receive the data over the data input bus for storing in the buffer memory, and a data output port for outputting the data stored in the buffer memory over the data output bus;

an address translator to receive the address data for translation into the memory address data and providing the memory address data to the address port of the buffer memory; and a memory allocation circuit having an allocation/de-allocation signal line for receiving allocation and de-allocation requests, a byte count bus for receiving a byte count with each of the allocation and de-allocation requests, an addressing bus for providing a first start address in response to an allocation request and receiving a second start address with a de-allocation request, and a control bus to load data to the address translator for translating the address data to the memory address data;

the method comprising dividing the address space into address blocks and the memory address space is divided into memory blocks, where each address block comprises a whole number of memory blocks;

wherein the memory allocation circuit, in response, to the allocation request, allocates sufficient consecutive addresses in the address space in the address blocks and sufficient number of the memory blocks of the buffer memory to store the byte count amount of memory, provides the first start address over the address bus, and loads the data to the address translator for translating the address data to the memory address data; and wherein the memory allocation circuit, in response, to the de-allocation request, de-allocates the address blocks starting at the first whole address block from the second start address for the whole address blocks of the byte count amount of memory and de-allocates the memory blocks corresponding to the de-allocated address blocks.

BRIEF DESCRIPTION OF THE DRAWINGS

The present invention will be described in detail with reference to the accompanying drawings, in which like numerals denote like parts, and in which.

DETAILED DESCRIPTION

Figure 1:
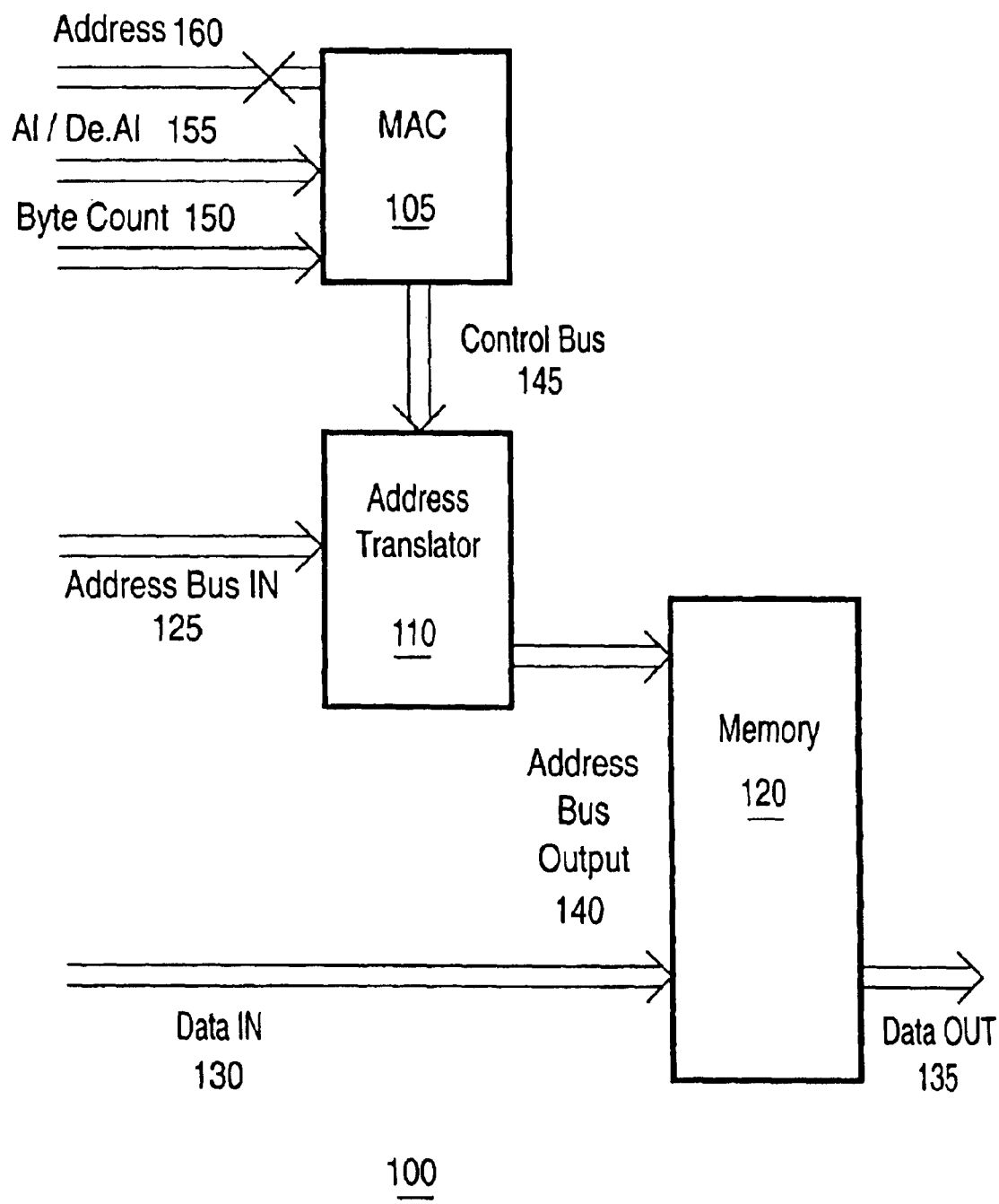
FIG. 1 is a block diagram of a Packet Buffer Memory 100 in accordance with one embodiment of the present invention.

Referring to FIG. 1, there is shown a block diagram of a Packet Buffer Memory 100 in accordance with one embodiment of the present invention. The Packet Buffer Memory 100 comprises a Memory Allocation Circuit 105, an Address Translator 110, Memory 120, an Address Input Bus 125 for receiving address data to access the Memory 120, a Data Input Bus 130 to receive data for storage in the Memory 120, a Data Output Bus 135 for outputting data from the Memory 120, an Address Bus Output 140 for transferring memory address data from the Address Translator 110 to address the Memory 120, and a Control Bus 145 for controlling the Address Translator 110. The Memory Allocation Circuit 105 is further connected to a Byte Count Bus 150, an Allocation/De-allocation Signal 155, and an Addressing Bus 160.

The Address Bus Input 125 has an address space that is divided into fixed size address blocks (address blocks) in the Memory Allocation Circuit 105. The Memory 120 has a memory address space that is also divided into fixed size memory address blocks (memory blocks) in the Memory Allocation Circuit 105.

The Packet Memory Buffer 100 is typically under the control of a processor. To allocate a buffer of memory to store a packet, the processor sends an allocation signal to the Packet Memory Buffer 100 over the Allocation/De-allocation Signal 155 with a byte count of the amount of memory requested on the Byte Count Bus 150. The Memory Allocation Circuit 105 then locates consecutive address space, in address blocks, sufficient to store the byte count and provides a first start address on the Addressing Bus 160 to the processor. The Memory Allocation Circuit 105 further allocates sufficient memory blocks for storing the byte count and loads the Address Translator 110 with the data necessary to translate the address data to the memory address data.

To de-allocate unused memory, the processor sends a de-allocate signal to the Packet Memory Buffer 100 over the Allocation/De-allocation Signal 155 with a de-allocate byte count of the amount of memory to be de-allocated and a second start address on the Addressing Bus 160. The Memory Allocation Circuit 105 then de-allocates (frees) whole and unused, address blocks and memory blocks. The memory address data to the unused memory blocks are read from the Address Translator 110 and accordingly set as free memory blocks in the Memory Allocation Circuit 105.

Figure 2A:
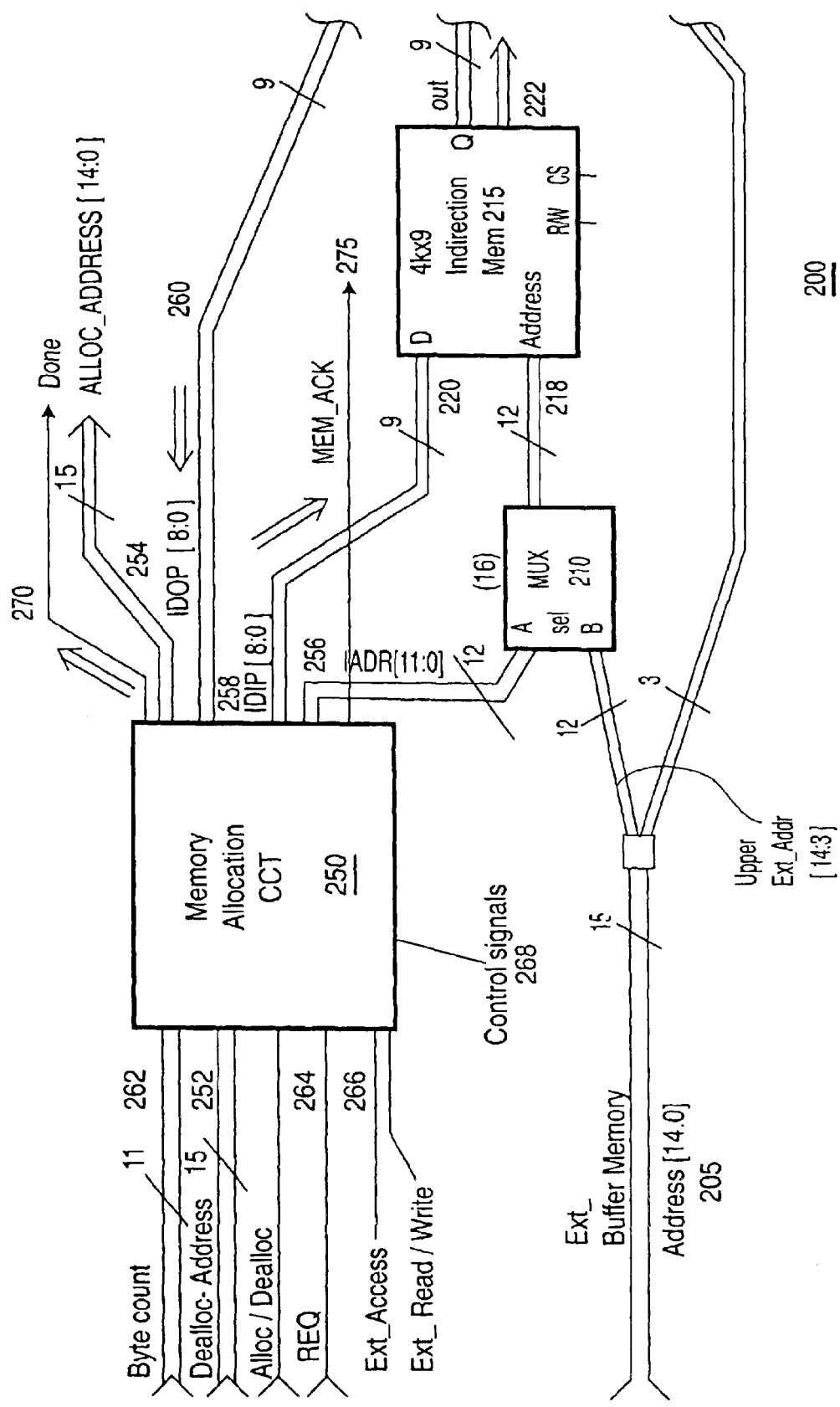
FIG. 2 is a block diagram of an exemplary implementation of the Packet Memory Buffer of FIG. 1 with a Memory Allocation CCT.
Figure 2B:
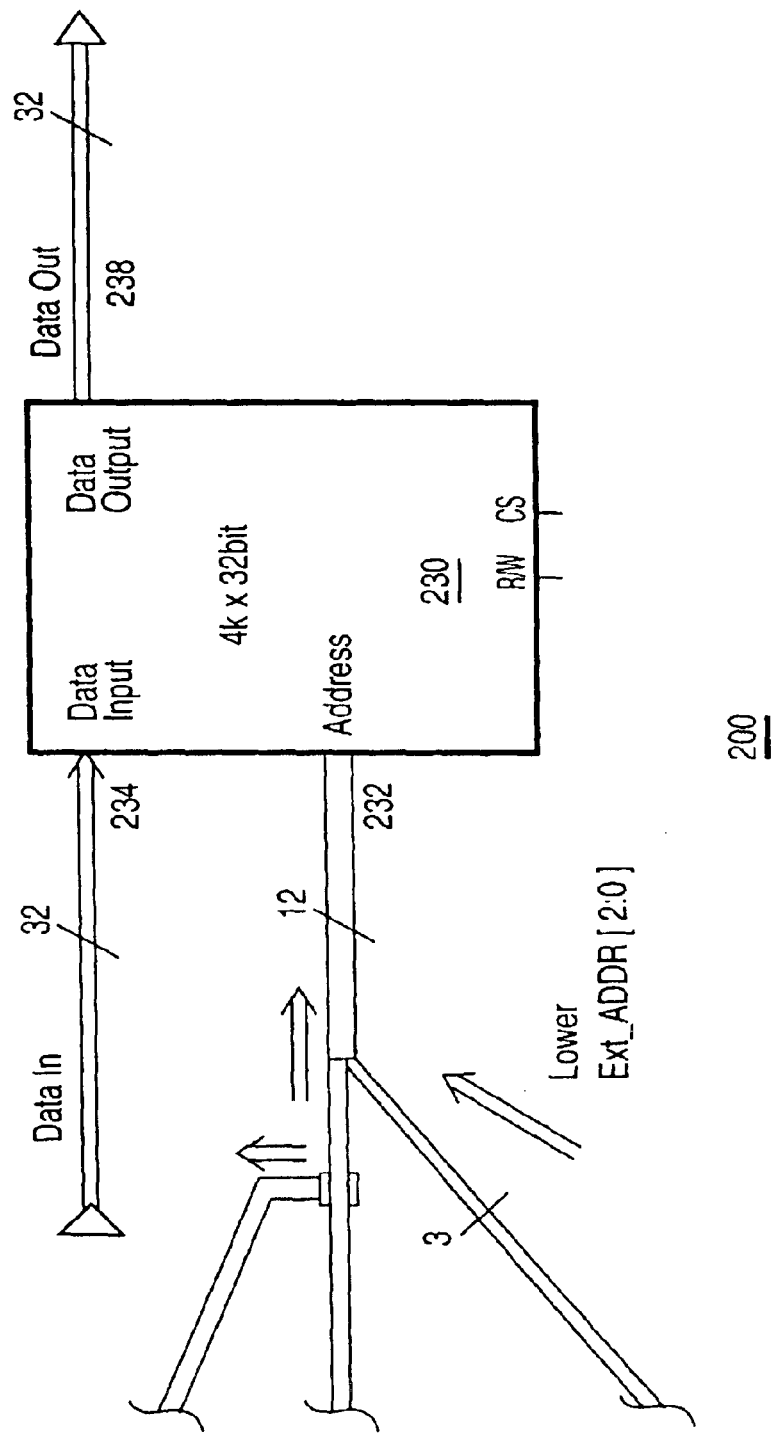

Referring to FIG. 2, there is shown a block diagram of an exemplary implementation 200 of the Packet Memory Buffer 100 of FIG. 1 with a Memory Allocation CCT 250. The exemplary implementation 200 of the Packet Memory Buffer 100 has configured the Memory 120 into 512 blocks (memory blocks) of memory, each 32 bytes long (8 longwords), for a total of 16K bytes (4K longwords), and the address space of the Address Bus Input 125 into 255 blocks (address blocks) of memory space (each block having 128 addresses) for a total addressable space of 32K (longwords). The first address block, corresponding to address 0 is not used. Instead, address block 0, the NULL address, is returned during an allocation if the allocation fails, for example, where there is not enough memory. A maximum buffer size of 2048 bytes (512 longwords) has been set to correspond with a maximum packet size.

The Address Translator 110 is implemented with a Multiplexer 210 and an Indirection Memory 215 with 4 k address space by 9 bits (4 k address space of 9 bits at each address space). The Indirection Memory 215 has an IM address port 218 for addressing the Indirection Memory 215, an IM data input port 220 for inputting data into the Indirection Memory 215, and an IM data output port 222 for outputting data stored in the Indirection Memory 215. The IM address port 218 is 12 bits wide, which correspond with the 4 k address space. The IM data input port 220 and the IM data output port 222 are both 9 bits wide.

The Memory 120 comprises a Buffer Memory 230 with 4 k address space by 32 bits. The Buffer Memory 230 has a BM address port 232 (12 bits wide), a BM data input port 234 (32 bits wide), and a BM data output port 236 (32 bits wide). The BM address port 232 is 12 bits wide to correspond with the 4 k address space.

The Address Input Bus 125 is implemented with an External Address Bus 205 that is 15 bits wide. The 15 bits corresponds with the total addressable space of 32 K bytes. The most significant 12 bits of the 15 bits are multiplexed by the Multiplexer 210 to the IM address port 218 for address translation to 9 bits. The 9 bits are then combined with the less significant 3 bits of the 15 bits to form 12 bit addresses for addressing the Buffer Memory 230.

The External Address Bus 205 is 15 bits wide and the three least significant bits are passed directly to the Buffer Memory 230 where the three least significant bits address the addresses within memory blocks and where the 12 most significant bits (with zeroed three least significant bits) represent the addresses to the memory blocks. Thus, each of the 9 bit addresses stored in the Indirection Memory 215 represents a memory block and accordingly incrementing the counter output by one represents addressing the next memory block.

The Memory Allocation Circuit 105 is implemented with the Memory Allocation CCT 250 that comprises a MAC dealloc address port 252 (15 bits wide) for receiving the second start address (a de-allocation address); a MAC alloc address port 254 (15 bits wide) for sending the first start address (an allocation address); a MAC address port 256 (12 bits wide) for addressing the Indirection Memory 215 via the Multiplexer 210; a MAC output port 258 (9 bits) to send 9 bit addresses to the Indirection Memory 215 for storage so that the Indirection Memory 215 accordingly translates 12 bit addresses to 9 bit addresses; a MAC input port 260 (9 bits wide) for receiving the 9 bit addresses stored in the Indirection Memory 215; and a Byte count port 262 (11 bits) for receiving the byte count.

The Memory Allocation CCT 250 further comprises Request and Alloc/Dealloc signal lines 264 to receive requests for allocation and de-allocation of memory; External Access and Read/Write signal lines 266 to receive external requests to read/write to the Buffer Memory 230; a MEM Ack line 275 for indicating completion of a memory access of Read/Write by an external device to the Buffer Memory 230; a Done line 270 for indicating completion of allocation and de-allocation of memory requests; and Control signal lines 268 (not shown) to the Multiplexer 210 for selecting addressing from either the External Address Bus 205 or the MAC address port 256, and the Indirection Memory 215 and the Buffer Memory 230 for selecting reads and writes to the respective memories.

Figure 3:
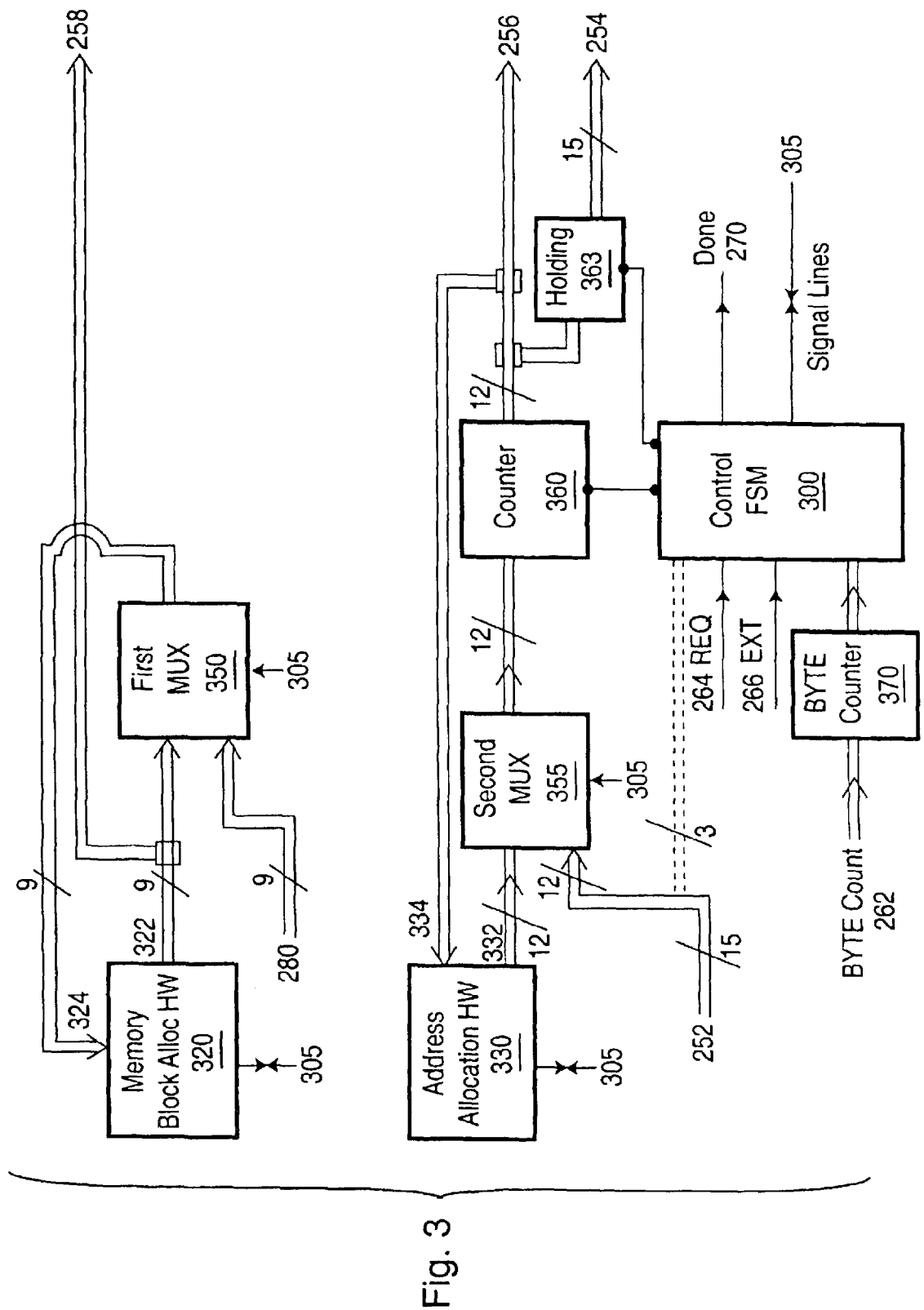
FIG. 3 is a block diagram of the Memory Allocation CCT of FIG. 2 with Address Block Allocation Memory Hardware and Memory Block Allocation Hardware.

Referring to FIG. 3, there is shown a block diagram of the Memory Allocation CCT 250 of FIG. 2 with Address Block Allocation Hardware 330 and Memory Block Allocation Hardware 320. The Memory Allocation CCT 250 comprises a Control FSM 300 (a state machine) for receiving and sending signals over signal lines 305 (including the Control Signals 268) to control all of the parts of the exemplary implementation 200; the Memory Block Allocation Hardware 320 for managing the memory blocks of the Buffer Memory 230; and the Address Allocation Hardware 330 for managing the address blocks of the address space of the exemplary implementation 200.

The Memory Allocation CCT 250 further comprises a first MUX (multiplexer) 350 to multiplex between the outputs of the MAC input port 260 and the outputs of a Block address output port 322 (9 bits) of the Memory Block Allocation Hardware 320 to provide an input to a Block address input port 324 (9 bits) of the Memory Block Allocation Hardware 320; and a second MUX 355 to multiplex between the output of the MAC dealloc address port 252 (most significant 12 bits) and the output of an Address allocation output port 332 (12 bits) of the Address Allocation Hardware 330.

The Memory Allocation CCT 250 further comprises a Counter 360 for receiving the output of the second MUX 355 and outputting a counter output where the counter output, which is an address, is decreased to the address of the next address block under the control of the Control FSM 300; a hold register 365 to latch the counter output under the control of the Control FSM 300 and to add 3 least significant zeros for forming 15 bit address outputs on the MAC alloc address port 254. The counter output is further sent to Address allocation input port 334 of the Address Allocation Hardware 330 so that the Address Allocation Hardware 330 receives the addresses of the address blocks being allocated and de-allocated.

The Memory Allocation CCT 250 further comprises a Byte counter 370 having the byte count port 262 for receiving and counting the number the byte count so that the Control FSM 300 accordingly allocates and de-allocates appropriate numbers of address blocks and memory blocks.

Signal lines to and from the Control FSM 300 have been grouped as signal lines 305 in order to keep FIG. 3 from becoming too complex. The signal lines 305 necessary to control all of the parts of the exemplary implementation 200 will be known by those skilled in the art.

The least significant 3 bits of an address provided on the MAC dealloc address port 252 are passed to the Control FSM 300 to determine if the address is at the beginning of an address block. If the address is not at the beginning of an address block, this indicates that the address block containing the address has at least partially been used to buffer a packet, then the address, as passed to the Counter 360 for outputting as the counter output, is decreased by the Counter 360 to the beginning of the next address block. If the address is at the beginning of an address block then the address as passed to the Counter 360 is not changed since the address block containing the address has not been used.

Figure 4:
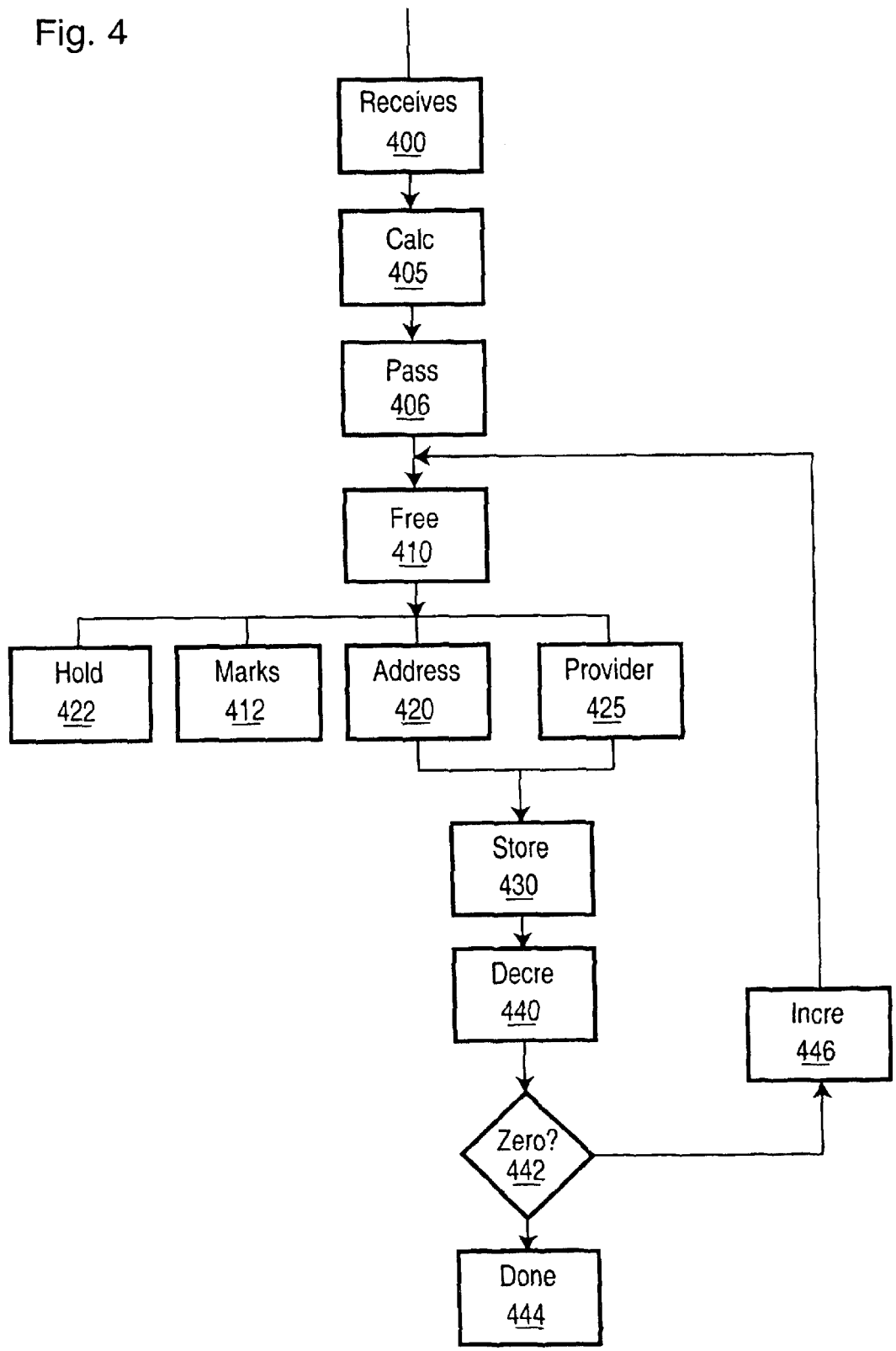
FIG. 4 is a flowchart of the steps of an allocation request for a maximum packet size buffer of 2048 bytes on the exemplary implementation 200 of FIG. 2.

Referring to FIG. 4, there is shown a flowchart of the steps of an allocation request for a maximum packet size buffer of 2048 bytes on the exemplary implementation 200 of FIG. 2. For the maximum packet size buffer of 2048 bytes or 512 longwords, the exemplary implementation 200 has to allocate 16 memory blocks and 4 consecutive address blocks address blocks. It is not 64 and 16 respectively, because the Buffer Memory 230 is organized in longwords (4 bytes per longword) and not bytes.

For the allocation request from a device, the exemplary implementation 200 receives an allocation signal on the Alloc/Dealloc signal lines 264 and a 2048 byte signal on the byte count port 262 (step 400). The Control FSM 300 calculates the number of address blocks used to store the bytes of the byte count from the Byte counter 370, which is four in this case, and signals the Address Allocation Hardware 330 for the first start address of four free consecutive address blocks (step 405) and the Address Allocation Hardware 330 then provides the first start address on Address allocation output port 332 to the second MUX 335, which is passed to the Counter 360 (step 406).

It is understood that the Control FSM 300 further signals the other parts of the exemplary implementation 200 to carry out the steps of this allocation request without further statements to indicate that the Control FSM 300 is accordingly controlling the other parts to carry out these steps.

The Control FSM 300 signals the Memory Block Allocation Hardware 320 to provide an address to a free memory block (step 410). The Counter 360 provides the counter output to the Address Allocation Hardware 330 over the Address allocation input port 334 so that Address Allocation Hardware 330 marks the address block pointed to by the counter output as being used when the counter output is the first address of an Address block (step 412). The Counter 360 further provides the counter output to the IM address port 218 of the Indirection Memory 215 for addressing the Indirection Memory 215 (step 420). The Counter 360 further provides the counter output to the holding register 365, which the Control FSM 300 controls to hold the first start address only, until the steps for this allocation request are completed, in order to provide the first start address to the device over the MAC alloc address port 254 even when the counter output is incremented in order to store more memory block addresses in the Indirection Memory 215 (step 422).

Upon receiving the signals from the Control FSM 300 to provide an address to a free memory block, the Memory Block Allocation Hardware 320 provides the address of the next free memory block over the Block address output port 322 to the IM data input port 220 via the first MUX 350. The address of the next free memory block is also returned to the Memory Block Allocation Hardware 320 via the Block address input port 324 so that the Memory Block Allocation Hardware 320 marks the next free memory block as not free (used). (step 425)

The Indirection Memory 215 then stores the address of the next free memory block from the IM data input port 220 at the address on the IM address port 218 (step 430).

The Byte counter 370 is decremented by 32, the number of bytes in a memory block (step 440), and then determine whether the byte count has become zero or a negative number (step 442). If Yes then sufficient memory blocks have been allocated and a done signal is send over the Done line 270 (step 444). If No then the count output of the Counter 360 is incremented by eight, the number of addresses for a memory block, in order to allocate another memory block (step 446) and this allocation is then repeated from step 410.

Figure 5:
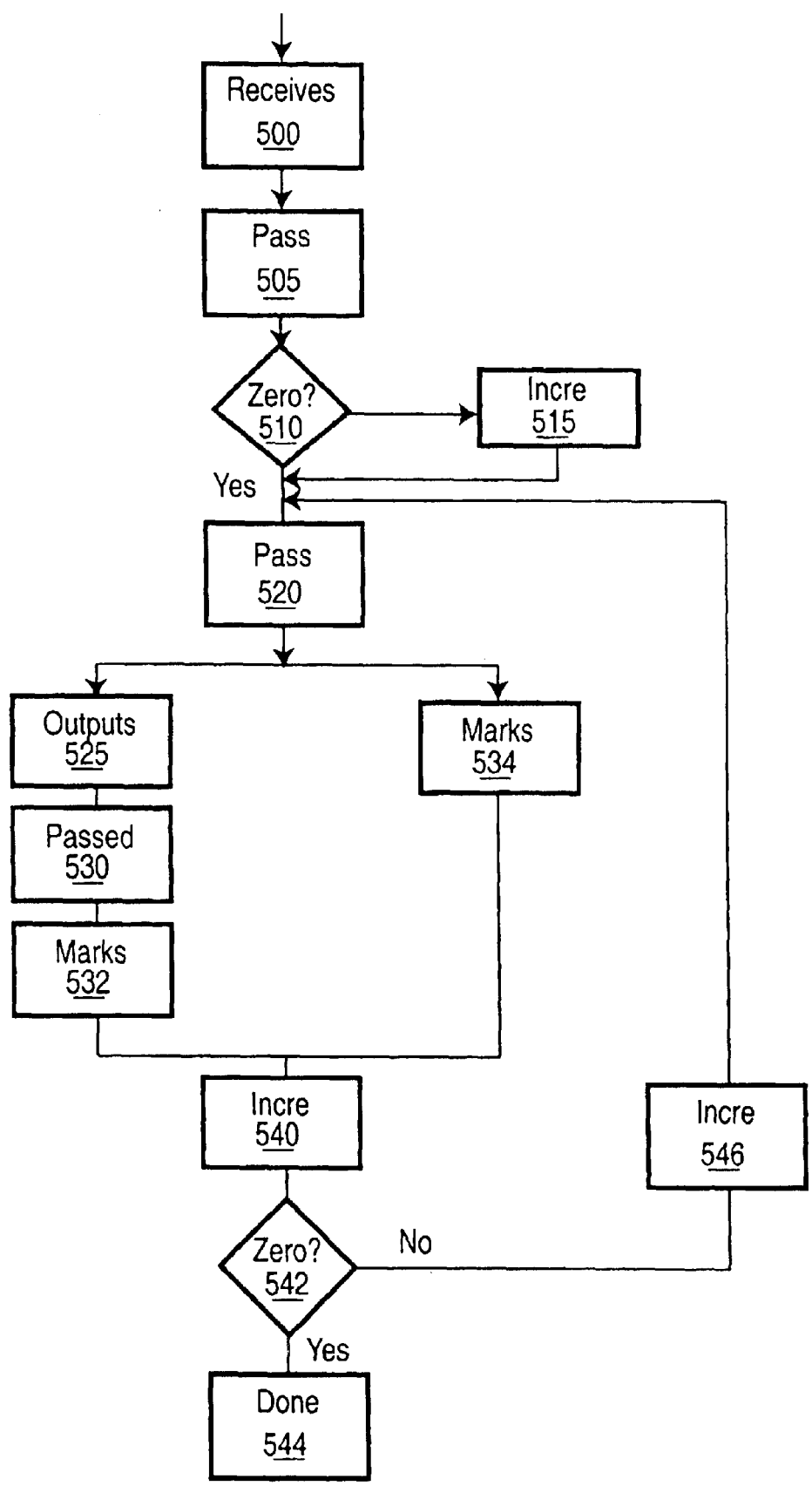
FIG. 5 is a flowchart of the steps of a de-allocation request on the exemplary implementation 200 of FIG. 2.

Referring to FIG. 5, there is shown a flowchart of the steps of a de-allocation request on the exemplary implementation 200 of FIG. 2. For the de-allocation request from the device, the exemplary implementation 200 receives a de-allocation signal on the Alloc/Dealloc signal lines 264, a 1048 byte signal on the byte count port 262, and the second start address (first address to de-allocate from) on the MAC dealloc address port 252(step 500). The 1048 bytes is the number of bytes that were not used after having buffered the packet and is thus being de-allocated so that the Buffer Memory 230 is free for other allocations.

The 12 most significant bits of the second start address are passed to the Counter 360 via the second MUX 355 and the three least significant bits to the Control FSM 300 (step 505). Determine if the three least significant bits of the second start address are not zero (step 510). If NO, the three least significant digits are not zero, then the count output is incremented by one (which represents one memory block) to the next memory block as not zero means that part of the current memory block is being used; and the Byte counter 370 decrements the byte count by 32 bytes (representing one memory block) (step 515). If YES, then continue.

The count output is passed to the Address Allocation Hardware 330 via the Address allocation input port 334 and to the Indirection Memory 215 via the Multiplexer 210 through the IM address port 218 (step 520).

The Indirection Memory 215 then outputs the memory block address stored at the address (the count output) received on the IM address port 218 on the IM data output port 222 (step 525). The memory block address is passed to the Memory Block Allocation Hardware 320 via the first MUX 350 through the Block address input port 324 (step 530). The Memory Block Allocation Hardware 320 the marks the memory block at the memory block address as free (not used) (step 532).

The Address Allocation Hardware 330 marks the address block pointed to by the counter output as being free (not used) when the counter output is the first address of an Address block (step 534).

The Byte counter 370 is decremented by 32, the number of bytes in a memory block (step 540), and then determine whether the byte count has become zero or a negative number (step 542). If Yes then sufficient memory blocks have been de-allocated and a done signal is send over the Done line 270 (step 544). If No then the count output of the Counter 360 is incremented by one, to the address of the next memory block, in order to de-allocate the next memory block (step 546) and this de-allocation is then repeated from step 520.

As will be known by those skilled in the art, the exemplary implementation 200 is accessed by an external device for read and write operations using the External Address Bus 205 for addressing; the External Access and Read/Write signal lines 266 for receiving external requests to read/write from/to the Buffer Memory 230; the MEM Ack line 275 for acknowledging completion of an access operation (read/write); the BM data input port 234 (32 bits wide) for writing data (for storage) into the exemplary implementation 200; and the BM data output port 236 (32 bits wide) for reading stored data from the exemplary implementation 200.

Figure 6:
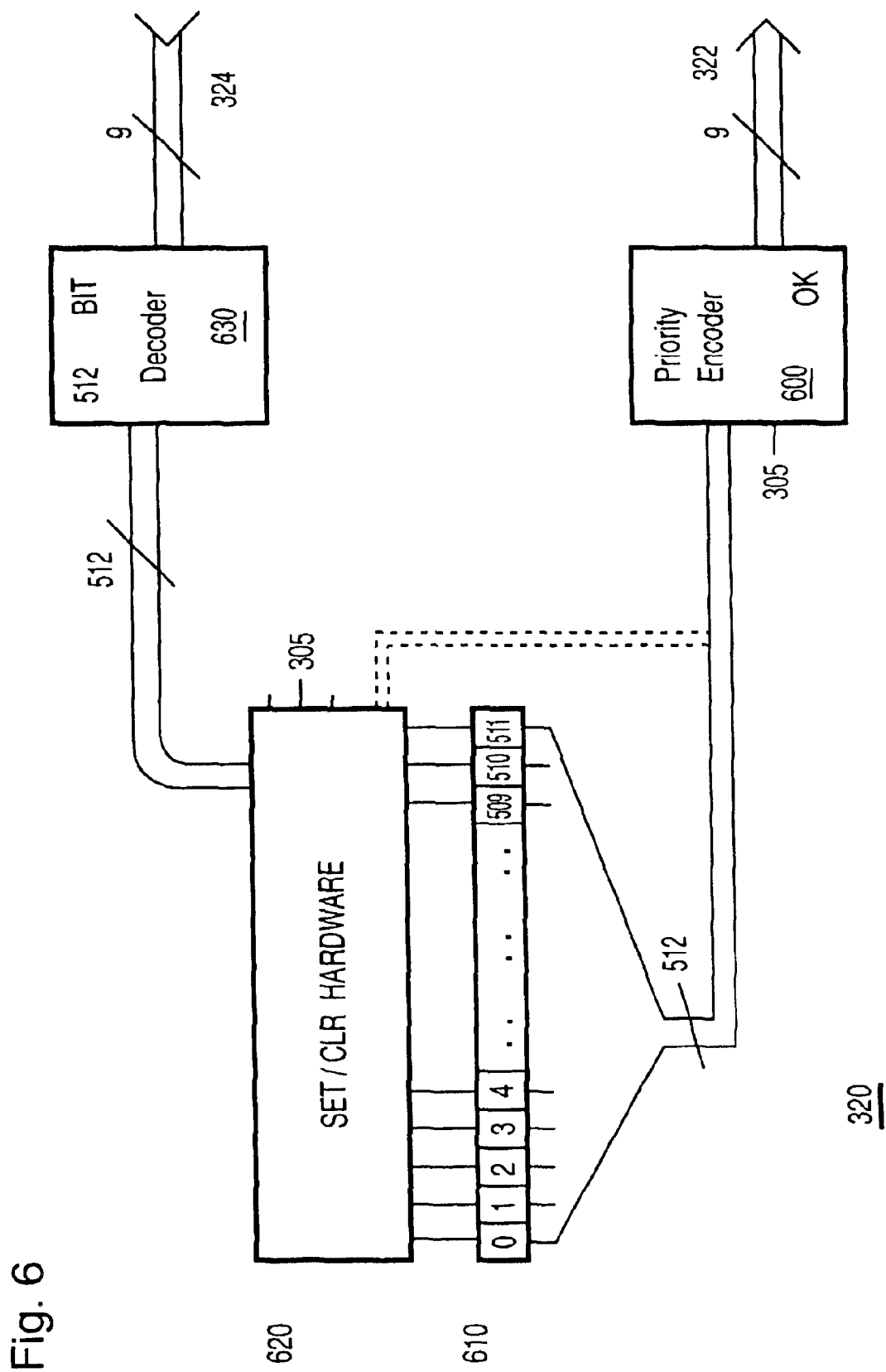
FIG. 6 is a block diagram of the Memory Block Allocation Hardware of FIG. 3.

Referring to FIG. 6, there is shown a block diagram of the Memory Block Allocation Hardware 320 of FIG. 3. The Memory Block Allocation Hardware 320 comprises a 512 bit Memory Block Allocation Table 610 for indicating a free or not free status to each of the memory blocks; a SET/CLR hardware 620 for setting the status of each bit of the 512 bit Memory Block Allocation Table 610; a 512 bit Decoder 630 for decoding the address on the Block address input port 324 to set the addressed bit of the 512 bit Memory Block Allocation Table 610; and a Priority Encoder 600 for detecting the next free memory block.

The coding, in hardware language VERILOG RTL, for the 512 bit Memory Block Allocation Table 610 is always @ (posedge CLK) if (ENA) Memory_Table [BLOCK_NO] <=SET/CLEAR.

The Priority Encoder 600 indicates the number of the next memory block of available for storage. An example for a 16 Bit Next Memory Block Detector in VERILOG RTL coding (module b_look(in,out,ok)) is

```
module b_look(in,out,ok);
input [15:0] in;
output [3:0] out;
output ok;
reg [3:0] out;
reg ok;
always @(in) casex(in)
    16'bxxxxxxxxxxxxxxx0: begin out<=4'd0; ok<=1'b0; end
    16'bxxxxxxxxxxxxxx0x: begin out<=4'd1; ok<=1'b0; end
    16'bxxxxxxxxxxxxx0xx: begin out<=4'd2; ok<=1'b0; end
    16'bxxxxxxxxxxxx0xxx: begin out<=4'd3; ok<=1'b0; end
    16'bxxxxxxxxxxx0xxxx: begin out<=4'd4; ok<=1'b0; end
```

16'bxxxxxxxxxx0xxxxx: begin out<=4'd5; ok<=1'b0; end
16'bxxxxxxxxx0xxxxxx: begin out<=4'd6; ok<=1'b0; end
16'bxxxxxxxx0xxxxxxx: begin out<=4'd7; ok<=1'b0; end
16'bxxxxxxx0xxxxxxxx: begin out<=4'd8; ok<=1'b0; end
16'bxxxxxx0xxxxxxxxx: begin out<=4'd9; ok<=1'b0; end
16'bxxxxx0xxxxxxxxxx: begin out<=4'd10; ok<=1'b0; end
16'bxxxx0xxxxxxxxxxx: begin out<=4'd11; ok<=1'b0; end
16'bxxx0xxxxxxxxxxxx: begin out<=4'd12; ok<=1'b0; end
16'bxx0xxxxxxxxxxxxx: begin out<=4'd13; ok<=1'b0; end
16'bx0xxxxxxxxxxxxxx: begin out<=4'd14; ok<=1'b0; end
16'b0xxxxxxxxxxxxxxx: begin out<=4'd15; ok<=1'b0; end
default: begin out<=4'hx; ok<=1'b1; end
endcase
endmodule The Priority Encoder 600 is implemented using this module b_look(in,out,ok) instantiated 34 times, to thus created a 512 Bit Next Memory Block Detector.

Figure 7:
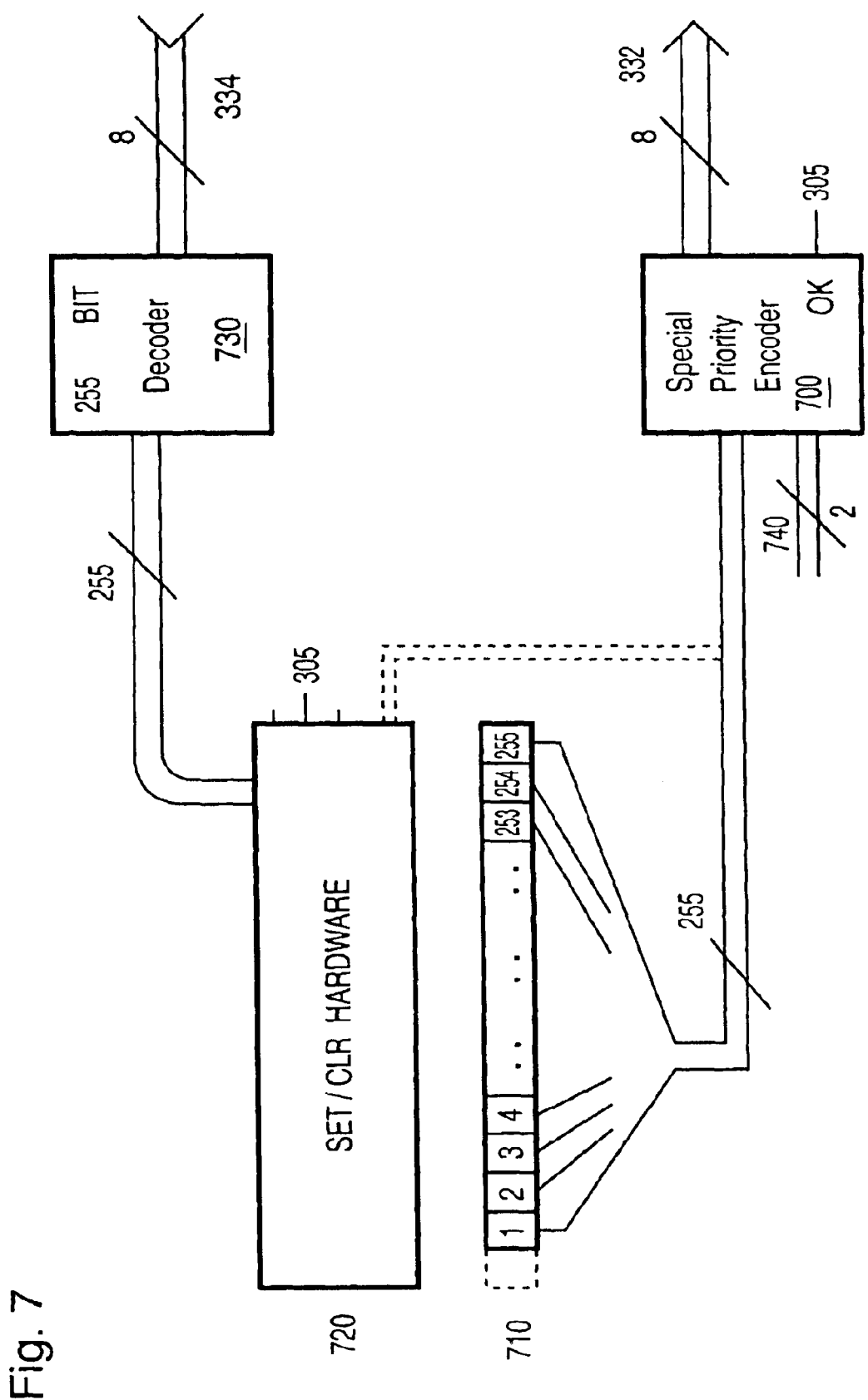
FIG. 7 is a block diagram of the Address Block Allocation Memory Hardware of FIG. 3.

Referring to FIG. 7, there is shown a block diagram of the Address Block Allocation Hardware 330 of FIG. 3. The Address Block Allocation Hardware 330 comprises a 255 bit Address Block Allocation Table 710 for indicating a free or not free status to each of the address blocks; a SET/CLR hardware 720 for setting the status of each bit of the 255 bit Address Block Allocation Table 710; a 255 bit Decoder 730 for decoding the address on the Address allocation input port 334 to set the addressed bit of the 255 bit Address Block Allocation Table 710; and a Special Priority Encoder 700 for detecting consecutive free address blocks.

The coding, in hardware language VERILOG RTL, for the 255 bit Address Block Allocation Table 710 is always @ (posedge CLK) if (AENA) Address_Table [ABLK_NO] <=ASET/CLEAR.

The Special Priority Encoder 700 indicates the number of the next address block of available for storage. An example for a 16 Bit Next Address Block Detector in VERILOG RTL coding (module b_look3(in,count,out,ok)) is
module b_look3(in,count,out,ok);
input [15:0] in;
input [1:0] count;
output [3:0] out;
output ok;
reg [3:0] out;
reg ok;
always @(in or count) casex({count,in})
18'b00xxxxxxxxxxxxxxx0: begin out<=4'd0; ok<=1'b0; end
18'b00xxxxxxxxxxxxxx0x: begin out<=4'd1; ok<=1'b0; end
18'b00xxxxxxxxxxxxx0xx: begin out<=4'd2; ok<=1'b0; end
18'b00xx0xxxxxxxxxxxxx: begin out<=4'd13; ok<=1'b0; end
18'b00x0xxxxxxxxxxxxxx: begin out<=4'd14; ok<=1'b0; end
18'b000xxxxxxxxxxxxxxx: begin out<=4'd15; ok<=1'b0; end
18'b01xxxxxxxxxxxxxx00: begin out<=4'd0; ok<=1'b0; end
18'b01xxxxxxxxxxxxx00x: begin out<=4'd1; ok<=1'b0; end
18'b01xxxxxxxxxxxx00xx: begin out<=4'd2; ok<=1'b0; end
18'b01xx00xxxxxxxxxxxx: begin out<=4'd12; ok<=1'b0; end
18'b01x00xxxxxxxxxxxxx: begin out<=4'd13; ok<=1'b0; end
18'b0100xxxxxxxxxxxxxx: begin out<=4'd14; ok<=1'b0; end
18'b10xxxxxxxxxxxxx000: begin out<=4'd0; ok<=1'b0; end
18'b10xxxxxxxxxxxx000x: begin out<=4'd1; ok<=1'b0; end
18'b10xxxxxxxxxxx000xx: begin out<=4'd2; ok<=1'b0; end
18'b10xx000xxxxxxxxxxx: begin out<=4'd11; ok<=1'b0; end
18'b10x000xxxxxxxxxxxx: begin out<=4'd12; ok<=1'b0; end
18'b10000xxxxxxxxxxxxx: begin out<=4'd13; ok<=1'b0; end
18'b11xxxxxxxxxxxx0000: begin out<=4'd0; ok<=1'b0; end
18'b11xxxxxxxxxxx0000x: begin out<=4'd1; ok<=1'b0; end
18'b11xxxxxxxxxx0000xx: begin out<=4'd2; ok<=1'b0; end
18'b11xx0000xxxxxxxxxx: begin out<=4'd10; ok<=1'b0; end
18'b1x0000xxxxxxxxxxxx: begin out<=4'd11; ok<=1'b0; end
18'b110000xxxxxxxxxxxx: begin out<=4'd12; ok<=1'b0; end
default: begin out<=4'hx; ok<=1'b1; end
endcase
endmodule The Special Priority Encoder 700 is implemented using this module b_look3(in,count,out,ok) extended to created a 512 Bit Next Address Block Detector. The Special Priority Encoder 700 further receives a 2 bit Needed Block Count 740 from the Control FSM 300 which indicates the number of required address block. The 2 bit Needed Block Count 740 lines between the Control FSM 300 to the Special Priority Encoder 700 has not been shown in the Figures.

It will be understood by those skilled in the art that the Control FSM 300 signals the various parts of the exemplary implementation 200 to carry out the operations described above without express statements to indicate that the Control FSM 300 is accordingly controlling the various parts.

It will be understood by those skilled in the art that the operation of the exemplary implementation 200, as an integrated circuit chip, is driven by clock cycles and that steps described in this application may require at least one clock cycle.

Although preferred embodiments of the invention have been described herein, it will be understood by those skilled in the art that variations may be made thereto without departing from the scope of the invention or the appended claims.

What is claimed is:

1. A memory circuit for buffering data, the memory circuit having an address input bus with an address space for receiving address data, a data input bus for receiving data, and a data output bus for outputting data; comprising a buffer memory having a memory address space and memory address data, an address port for receiving the memory address data to address the buffer memory, a data input port to receive the data over the data input bus for storing in the buffer memory, and a data output port for outputting the data stored in the buffer memory over the data output bus;

an address translator to receive the address data for translation into the memory address data and providing the memory address data to the address port of the buffer memory; and a memory allocation circuit having an allocation/de-allocation signal line for receiving allocation and de-allocation requests, a byte count bus for receiving a byte count with each of the allocation and de-allocation requests, an addressing bus for providing a first start address in response to an allocation request and receiving a second start address with a de-allocation request, and a control bus to load data to the address translator for translating the address data to the memory address data;

wherein the address space is divided into address blocks, the memory address space is divided into memory blocks, and each address block comprises a fixed number of memory blocks;

wherein the memory allocation circuit, in response, to the allocation request, allocates sufficient consecutive addresses in the address space in the address blocks and sufficient number of the memory blocks of the buffer memory to store the byte count amount of memory, provides the first start address over the address bus, and loads the data to the address translator for translating the address data to the memory address data;

wherein the memory allocation circuit, in response, to the de-allocation request, de-allocates the address blocks starting at the first whole address block from the second start address for the whole address blocks of the byte count amount of memory and de-allocates the memory blocks corresponding to the de-allocated address blocks; and wherein the address translator comprises an indirection memory to store the data for translating the address data to the memory address data where the data in the indirection memory comprises the memory address data stored at indirection memory addresses corresponding to the address data.

2. The memory circuit of claim 1, wherein the memory allocation circuit comprises an address block allocation hardware for detecting consecutive address blocks according to the byte count and then providing the first start address, and for tracking a status to each address block where the status is one of free and used.

3. The memory circuit of claim 2, wherein the memory allocation circuit further comprises a memory block allocation hardware for detecting free memory blocks and providing the memory address data of one memory block that is a next free memory block and for tracking a status to each memory block where the status is one of free and used.

4. The memory circuit of claim 3, wherein the memory allocation circuit further comprises a counter where, in response to the allocation request, increments the first start address for addressing the indirection memory to store the memory address data of next free memory blocks and providing the addresses of the consecutive address blocks to the address block allocation hardware to change the status of the respective address blocks to used; and where the memory address data of next free memory blocks are provided to the memory block allocation hardware to the change the status of the respective memory blocks to used.

5. The memory circuit of claim 4, wherein the counter, in response to the de-allocation request, increments the second start address for addressing the indirection memory to retrieve stored memory address data for the memory block allocation hardware to change the status of the respective memory blocks to free and providing the addresses from the second start address of the consecutive address blocks to the address block allocation hardware to change the status of the respective address blocks to free.

6. The memory circuit of claim 2, wherein the address block allocation hardware further comprises an address block allocation table for tracking the status of each address block, and a special priority encoder for detecting consecutive free address blocks from the address block allocation table.

7. The memory circuit of claim 6, wherein the special priority encoder comprises an instantiation of 18'b1x0xxxxxx . . . xxxxxxx: begin out<=4'd13; ok<=1'b0; end for (X+1) is the number of address blocks where the zero represent one free address block.

8. The memory circuit of claim 6, wherein the special priority encoder comprises an instantiation of 18'b100xxxxxx . . . xxxxxxx: begin out<=4'd13; ok<=1'b0; end for (X+2) is the number of address blocks where the zeroes represent two consecutive free address blocks.

9. The memory circuit of claim 3, wherein the memory block allocation hardware further comprises a memory block allocation table for tracking the status of each memory block, and a priority encoder for detecting the next free memory block from the memory block allocation table and providing the memory address data of the next free memory block.

10. The memory circuit of claim 3, wherein the priority encoder comprises an instantiation of X'bxx0xxxxxxx . . . xxxxxx: begin out<=4'd13; ok<=1'b0; end for (X+1) is the number of memory blocks where the zero represents one free memory block.

11. The memory circuit of claim 1, wherein the least significant bits of the address data, representing addressing of the buffer memory within a memory block, bypass the address translator to address the buffer memory.

12. A method to allocate and de-allocate memory of a memory circuit for buffering data, the memory circuit comprising an address input bus with an address space for receiving address data, a data input bus for receiving data, and a data output bus for outputting data;

a buffer memory having a memory address space and memory address data, an address port for receiving the memory address data to address the buffer memory, a data input port to receive the data over the data input bus for storing in the buffer memory, and a data output port for outputting the data stored in the buffer memory over the data output bus;

an address translator to receive the address data for translation into the memory address data and providing the memory address data to the address port of the buffer memory; and a memory allocation circuit having an allocation/de-allocation signal line for receiving allocation and de-allocation requests, a byte count bus for receiving a byte count with each of the allocation and de-allocation requests, an addressing bus for providing a first start address in response to an allocation request and receiving a second start address with a de-allocation request, and a control bus to load data to the address translator for translating the address data to the memory address data;

the method comprising dividing the address space into address blocks and the memory address space is divided into memory blocks, where each address block comprises a fixed number of memory blocks;

wherein the memory allocation circuit, in response, to the allocation request, allocates sufficient consecutive addresses in the address space in the address blocks and sufficient number of the memory blocks of the buffer memory to store the byte count amount of memory, provides the first start address over the address bus, and loads the data to the address translator for translating the address data to the memory address data;

wherein the memory allocation circuit, in response, to the de-allocation request, de-allocates the address blocks starting at the first whole address block from the second start address for the whole address blocks of the byte count amount of memory and de-allocates the memory blocks corresponding to the de-allocated address blocks; and wherein the address translator comprises an indirection memory to store the data for translating the address data to the memory-address data where the data in the indirection memory comprises the memory address data stored at indirection memory addresses corresponding to the address data.

13. The method of claim 12, wherein the memory allocation circuit comprises an address block allocation hardware for detecting consecutive address blocks according to the byte count and then providing the first start address, and for tracking a status to each address block where the status is one of free and used.

14. The method of claim 13, wherein the memory allocation circuit further comprises a memory block allocation hardware for detecting free memory blocks and providing the memory address data of one memory block that is a next free memory block and for tracking a status to each memory block where the status is one of free and used.

15. The method of claim 14, wherein the memory allocation circuit further comprises a counter where, in response to the allocation request, increments the first start address for addressing the indirection memory to store the memory address data of next free memory blocks and providing the addresses of the consecutive address blocks to the address block allocation hardware to change the status of the respective address blocks to used; and where the memory address data of next free memory blocks are provided to the memory block allocation hardware to the change the status of the respective memory blocks to used.

16. The method of claim 15, wherein the counter, in response to the de-allocation request, increments the second start address for addressing the indirection memory to retrieve stored memory address data for the memory block allocation hardware to change the status of the respective memory blocks to free and providing the addresses from the second start address of the consecutive address blocks to the address block allocation hardware to change the status of the respective address blocks to free.

17. The method of claim 13, wherein the address block allocation hardware further comprises an address block allocation table for tracking the status of each address block, and a special priority encoder for detecting consecutive free address blocks from the address block allocation table.

18. The method of claim 17, wherein the special priority encoder comprises an instantiation of 18'b1x0xxxxxx . . . xxxxxxx: begin out<=4'd13; ok<= 1'b0; end for (X+1) is the number of address blocks where the zero represent one free address block.

19. The method of claim 17, wherein the special priority encoder comprises an instantiation of 18'b100xxxxxx . . . xxxxxxx: begin out<=4'd13; ok<= 1'b0; end for (X+2) is the number of address blocks where the zeroes represent two consecutive free address blocks.

20. The method of claim 14, wherein the memory block allocation hardware further comprises a memory block allocation table for tracking the status of each memory block, and a priority encoder for detecting the next free memory block from the memory block allocation table and providing the memory address data of the next free memory block.

21. The method of claim 14, wherein the priority encoder comprises an instantiation of X'bxx0xxxxxxx . . . xxxxxx: begin out<=4'd13; ok<=1'b0; end for (X+1) is the number of memory blocks where the zero represents one free memory block.

22. The method of claim 12, wherein the least significant bits of the address data, representing addressing of the buffer memory within a memory block, bypass the address translator to address the buffer memory.

* * * * *